US012746874B2

(12) United States Patent
Lamoureux

(10) Patent No.: US 12,746,874 B2
(45) Date of Patent: Sep. 29, 2026

(54) GLAZING COMPRISING AN INTERIOR LIGHTING SYSTEM, INTERIOR LIGHTING SYSTEM AND METHOD OF MANUFACTURING SUCH A GLAZING

(71) Applicant: SAINT-GOBAIN SEKURIT FRANCE, Thourotte (FR)

(72) Inventor: Laurent Lamoureux, Thourotte (FR)

(73) Assignee: SAINT-GOBAIN SEKURIT FRANCE, Thourotte (FR)

(*) Notice: Subject to any disclaimer, the term of this patent is extended or adjusted under 35 U.S.C. 154(b) by 0 days.

(21) Appl. No.: 19/119,606

(22) PCT Filed: Oct. 6, 2023

(86) PCT No.: PCT/EP2023/077684
§ 371 (c)(1),
(2) Date: Apr. 9, 2025

(87) PCT Pub. No.: WO2024/078982
PCT Pub. Date: Apr. 18, 2024

(65) Prior Publication Data

US 2026/0167103 A1 Jun. 18, 2026

(30) Foreign Application Priority Data

Oct. 10, 2022 (FR) ...................................... 2210360

(51) Int. Cl.
*B60Q 3/51* (2017.01)
*B60Q 3/64* (2017.01)

(52) U.S. Cl.
CPC ................ *B60Q 3/51* (2017.02); *B60Q 3/64* (2017.02)

(58) Field of Classification Search
CPC .................................. B60Q 3/51; B60Q 3/64
See application file for complete search history.

(56) References Cited

U.S. PATENT DOCUMENTS

| | | | | |
|---|---|---|---|---|
| 8,192,063 | B2 | 6/2012 | Neufeglise | |
| 10,525,874 | B2 * | 1/2020 | Park | B60Q 3/208 |
| 2013/0058115 | A1 * | 3/2013 | Pfeil | G02B 6/001 362/511 |
| 2014/0268845 | A1 | 9/2014 | Davis | |

(Continued)

FOREIGN PATENT DOCUMENTS

| | | | |
|---|---|---|---|
| CN | 208123991 | U | 11/2018 |
| CN | 211942909 | U | 11/2020 |

(Continued)

OTHER PUBLICATIONS

International Search Report as issued in International Patent Application No. PCT/EP2023/077684, dated Nov. 24, 2023.

*Primary Examiner* — Tsion Tumebo
(74) *Attorney, Agent, or Firm* — CUSHMAN PARTNERS, LLC

(57) ABSTRACT

A vehicle glazing includes a curved glazed element, including a lighting system, and at least two longitudinal light modules, each supporting several adjacent point light sources, each having a longitudinal end facing a longitudinal end of the other, and at least one orientation support having a base located more centrifugally than the two longitudinal ends and being fastened or attached to the glazed element, the orientation support making it possible to attach and spatially orient the two longitudinal ends.

20 Claims, 4 Drawing Sheets

(56) References Cited

U.S. PATENT DOCUMENTS

| | | | | |
|---|---|---|---|---|
| 2017/0001556 | A1 | 1/2017 | Bergeler | |
| 2019/0001875 | A1* | 1/2019 | Xu | B60Q 3/54 |
| 2019/0135170 | A1* | 5/2019 | Salter | B60Q 3/20 |
| 2019/0176691 | A1* | 6/2019 | Vervoort | B60J 7/04 |
| 2020/0241189 | A1* | 7/2020 | Schabacker | G02B 6/001 |
| 2022/0185177 | A1* | 6/2022 | Baker | B60Q 1/268 |

FOREIGN PATENT DOCUMENTS

| | | | |
|---|---|---|---|
| EP | 3 245 083 | B1 | 1/2021 |
| FR | 2 937 711 | A1 | 4/2010 |

* cited by examiner

[Fig.1]
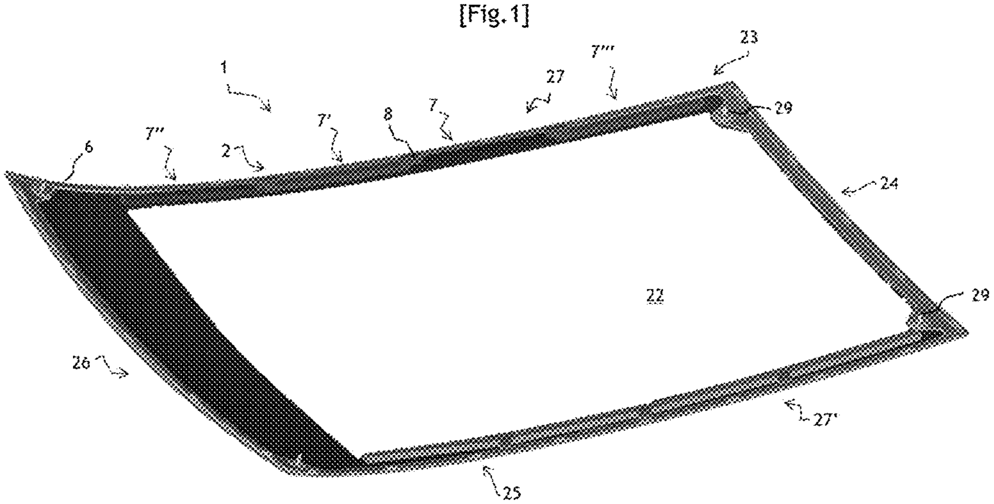
[Fig.2]
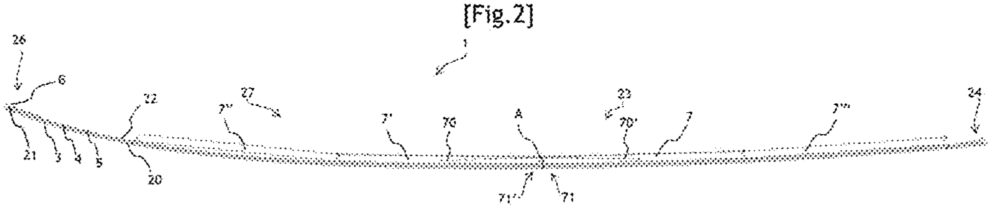
[Fig.3]
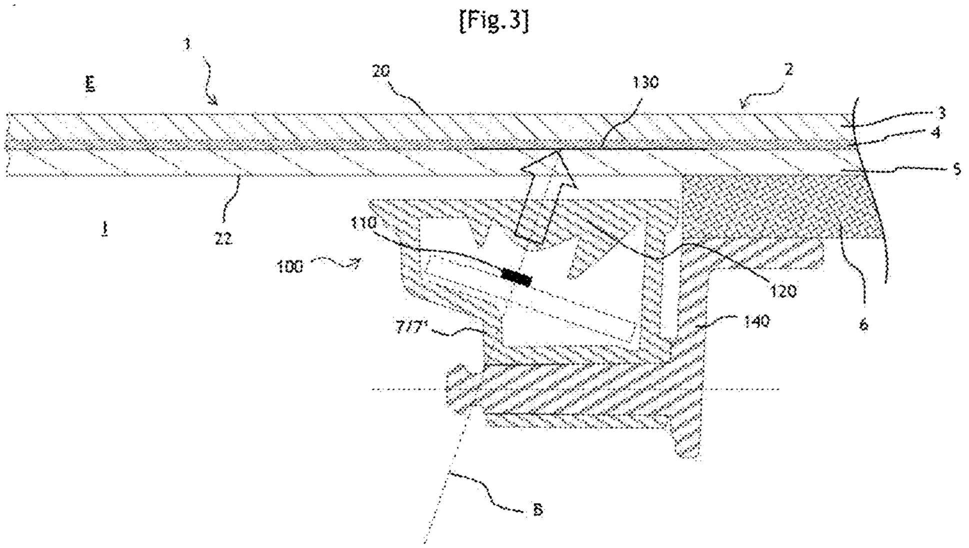

[Fig.4]
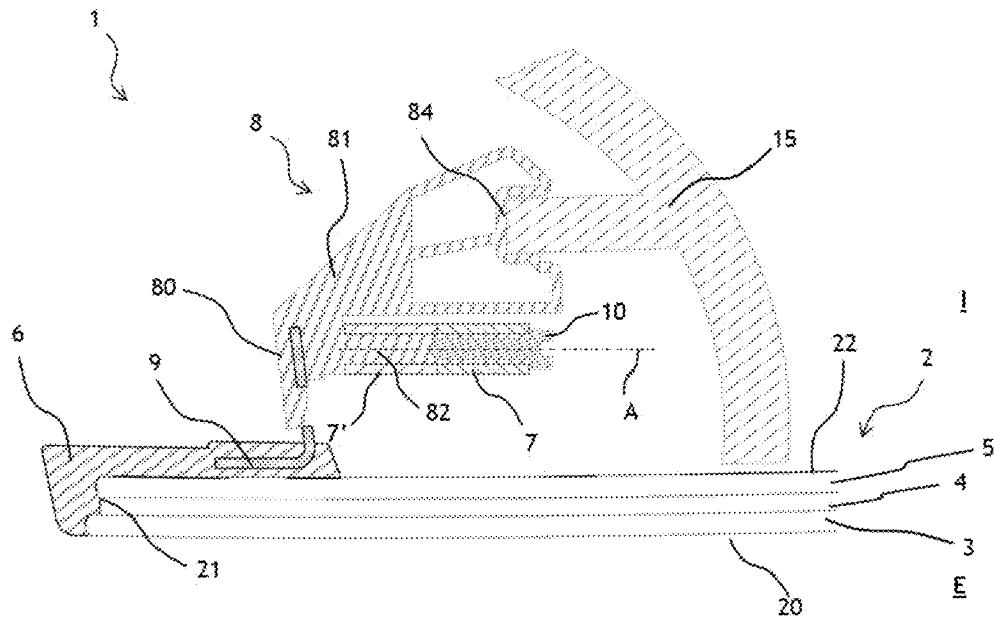
[Fig.5]
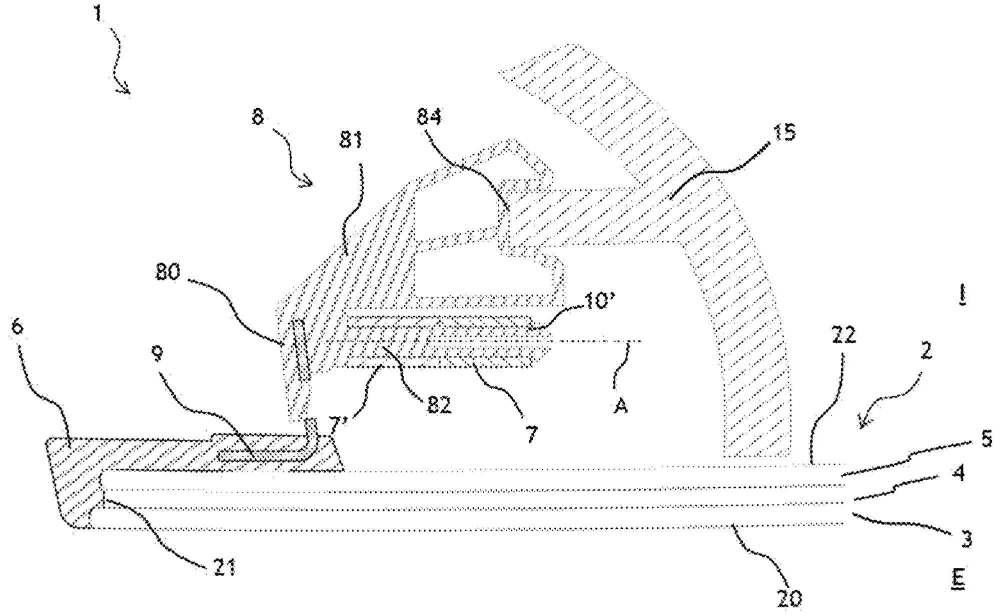

[Fig.6]
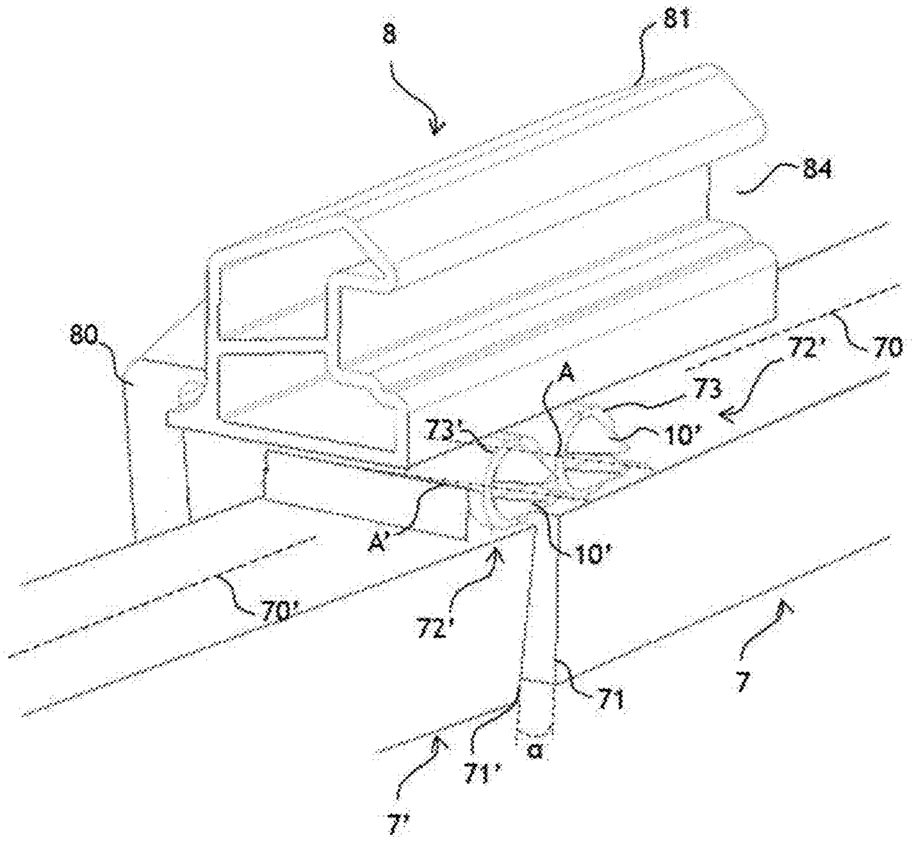
[Fig.7]
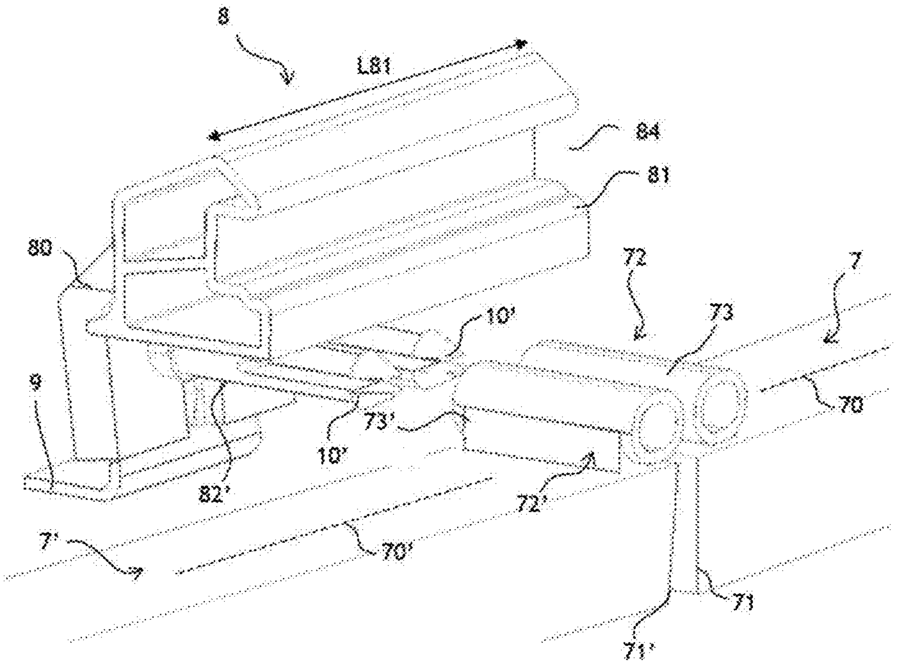

[Fig.8]
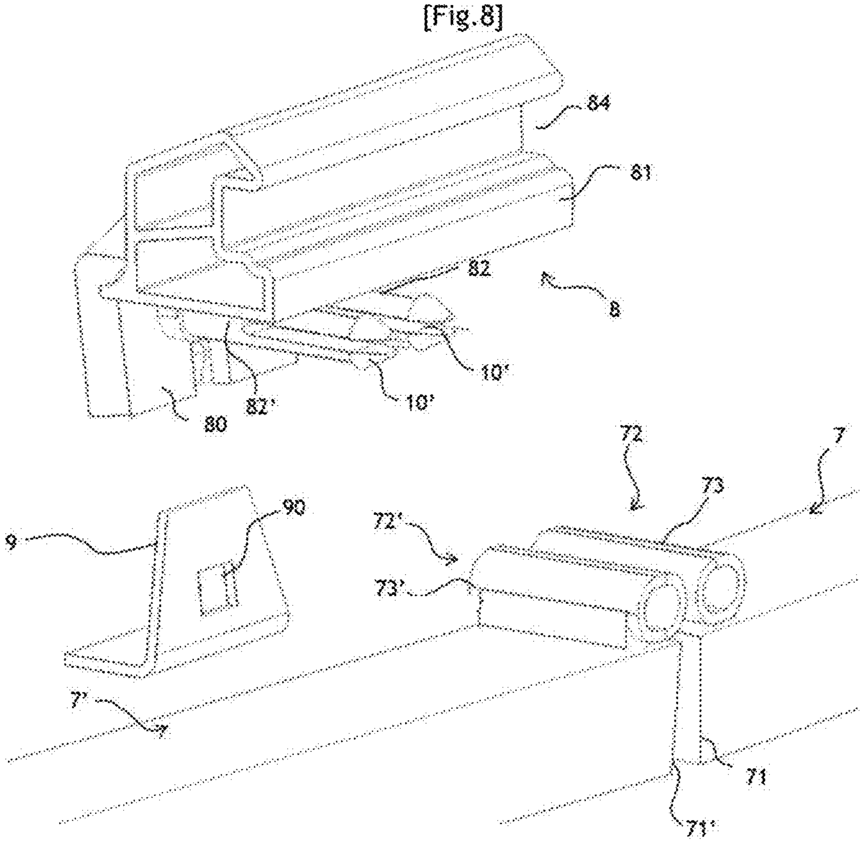
[Fig.9]
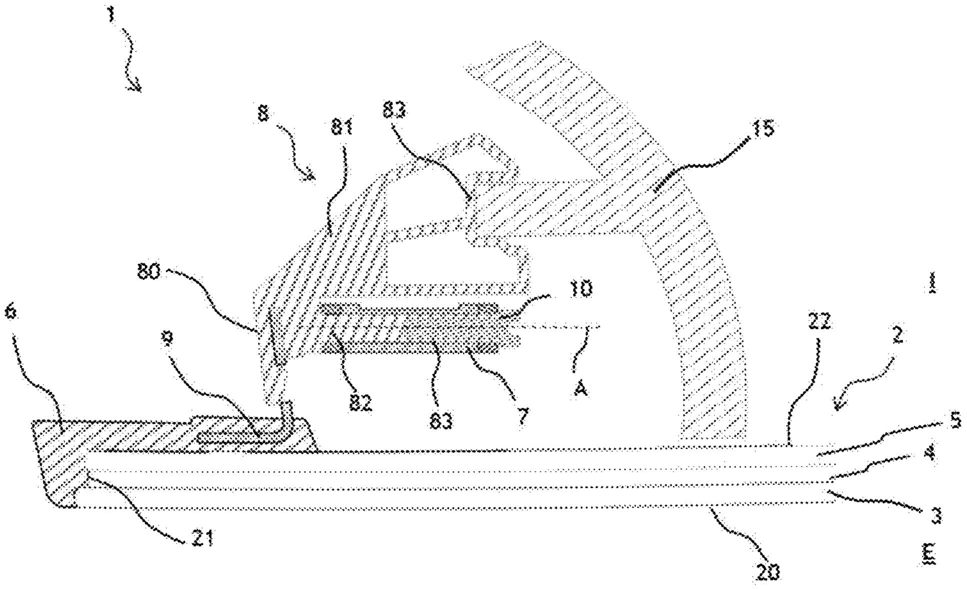

GLAZING COMPRISING AN INTERIOR LIGHTING SYSTEM, INTERIOR LIGHTING SYSTEM AND METHOD OF MANUFACTURING SUCH A GLAZING

CROSS-REFERENCE TO RELATED APPLICATIONS

This application is the U.S. National Stage of PCT/EP2023/077684, filed Oct. 6, 2023, which in turn claims priority to French patent application number 2210360 filed Oct. 10, 2022. The content of these applications are incorporated herein by reference in their entirety.

The invention relates to the field of vehicle glazings, in particular motor vehicle glazings, and in particular to vehicle roof glazings. More specifically, the invention relates to a glazing comprising a curved, that is, non-flat, glazed element and an interior lighting system.

The present invention relates to a glazing, in particular for a motor vehicle roof, with a curved glazed element that can be illuminated from within.

More specifically, the invention relates to a glazing comprising a curved glazed element providing a separation between an exterior space and an interior space and having an external face oriented toward said exterior space, an internal face oriented toward said interior space and an edge face located between these two faces, said glazing comprising a lighting system comprising multiple point light sources, of the LED type, and extending along at least one edge of said glazing, and preferably along two opposite edges of said glazing, being located further inwards than said internal face of the glazed element.

In such a glazing, a prismatic system is often inserted between the point light sources and the glazed element or part of the glazed element (recess over part of the thickness of the glazed element). In such a glazing, it is important that the positioning in the inside-outside direction of the point light sources follows the shape (curvature) of the glazed element with an acceptable tolerance (e.g. plus or minus 2.0 mm or even less), without being in direct contact with this glazed element, in order to achieve uniform illumination through the glazed element.

However, when the glazed element is curved, this curvature is not uniform in the sense that it is made up of a plurality of radii of curvature, at different locations on the glazed element, and in particular along the edge(s) that accommodate(s) the lighting system(s). It is then difficult to control the distance between the point light sources and the glazed element, as the point light sources would have to be arranged on a support that also precisely follows the curves of the curvature along this (or these) edge(s).

Additionally, the curvature has a fairly large manufacturing tolerance, and the design of a curved point light source support also has a manufacturing tolerance; the combination of these two tolerances makes it more complex to control the distance between the point light sources and the glazed element in order to remain within the required tolerance.

The present invention is based on the discovery that, surprisingly, it is possible to produce a glazing with a curved glazed element and point light sources which are not all located at exactly the same distance from the glazed element (applying, for example, a tolerance of a tenth of a millimeter) but which are all located at an acceptable distance from the glazed element (applying, for example, a tolerance of plus or minus 2.0 mm), using multiple point light source supports, or light modules, and providing at least one intermediate orientation support that enables both the attachment of the light modules to the glazed element and the modification of the orientation of the ends of two adjacent light modules relative to the glazed element at the time of this attachment.

Thus, it is no longer necessary to provide a particular curvature of the light modules; it is possible to use rectilinear light modules (that is, not curved along their length); the orientation support will make it possible, at the time of attachment of a light module to the support, to apply a particular orientation to the light module along its length which will be different from the orientation along its length of the adjacent light module attached to the same orientation support, so as to enable it to follow the curvature of the glazed element.

This adaptation of the light module's orientation in relation to the glazed element is sufficient to adapt the lighting system to the curvature of the glazed element and ensure that the module's point light sources are all at the same distance from the inner face of the glazed element, with a satisfactory tolerance.

The invention thus relates, in its broadest sense, to a glazing according to claim 1.

This glazing comprises a curved glazed element providing a separation between an exterior space and an interior space and having an external face, an internal face and an edge face situated between these two faces, said glazing comprising a lighting system comprising several point light sources, of the LED type, and extending along at least one edge of said glazed element, and preferably along two opposite edges of said glazed element, situated further to the inside than said internal face of the glazed element, the glazing being remarkable in that it comprises:

- at least two adjacent longitudinal light modules, each supporting several point light sources, each oriented along its length in a longitudinal direction one after the other and each having a longitudinal end facing a longitudinal end of the other, and
- at least one orientation support having a base located more centrifugally than the two longitudinal ends and being fastened or attached to said glazed element, said orientation support making it possible to attach and spatially orient said two longitudinal ends about an axis of rotation substantially parallel to said glazed element; this axis of rotation is both substantially parallel to said glazed element and perpendicular to said longitudinal direction.

Within the meaning of the present invention, a fastening is a chemical connection between at least two elements, and an attachment is a purely mechanical connection between at least two elements; attachment, such as clipping or screwing, can be reversed by a detaching operation, and this operation does not affect the integrity of the detached elements, whereas fastening, such as gluing, cannot be reversed without altering the integrity of the elements fastened together.

The fact that the light modules are each oriented along their length in a longitudinal direction means that they are each oriented along their length in a single longitudinal direction; each light module is thus preferably straight in said longitudinal direction; in absolute terms, the light modules may be slightly curved in said longitudinal direction.

Preferably, said orientation support enables said two longitudinal ends to be oriented about an axis of rotation, or even two axes of rotation, substantially parallel to said glazed element (that is, the axis or axes are not perpendicular to said glazed element) to facilitate adaptation to the curvature of the glazed element. This axis or these axes of rotation is or are both substantially parallel to said glazed element and perpendicular to said longitudinal direction.

Thus, to compensate for a curvature of the glazed element where necessary, said longitudinal directions of the two adjacent light modules are not parallel.

The fact that each light module has one longitudinal end facing one longitudinal end of the other means that these two ends are generally opposite one another in space, but may not be strictly opposite one another in space, since the longitudinal directions of the two adjacent light modules may not be parallel.

Preferably, said orientation support comprises a flange extending from said base in a centripetal direction and located under both longitudinal ends, further inward (that is, more in the interior space) than these longitudinal ends, said longitudinal ends being attached to said flange; such a structure facilitates the attachment of the longitudinal ends to the orientation support.

Preferably, said flange has a longitudinal groove, located further inwards than said flange, to accommodate a trim; the orientation support then has the additional function of accommodating a trim and ensuring an adequate distance between this trim, the light modules and the glazed element.

Preferably, said orientation support has one, or two, male element(s) or one, or two, hollow female element(s) and said longitudinal ends each respectively have a hollow female element located around a male element of said orientation support or a male element surrounded by a female element of said orientation support, for attachment and orientation of said light modules to said orientation support; a male-female engagement enables compact retention while providing a degree of rotational freedom.

Preferably, said hollow female element has a circular or oblong internal cross-section and said male element has a circular external cross-section; an oblong male-female engagement enables compact retention while offering a degree of rotational and translational freedom.

Preferably, said male element has a cavity for receiving the attachment lock; such a configuration makes it possible to achieve a very compact lock.

In one variant, for an orientation support, two adjacent light modules each comprise a hollow cylinder, the two hollow cylinders each having an axis and the two axes being parallel.

In one variant, for another orientation support, two adjacent light modules each comprise a hollow cylinder, the two hollow cylinders each having an axis and the two axes not being parallel.

Preferably, said glazing includes one, and preferably only one, orientation support at each connection between two adjacent light modules. The orientation supports are thus located at the point of connection between two light modules, or even further at one or both longitudinal ends of a lighting system along one edge of the glazed element. Preferably, to save material (and also to reduce weight), there is no orientation support material between two orientation supports of a lighting system.

Said glazing preferably comprises n, integer, light modules which are located along one edge of said glazed element and n+1 orientation supports enable these light modules to be attached and oriented along this edge; thus, each light module of a lighting system is attached at its two longitudinal ends by a single orientation support.

Said base of the orientation support can be fastened or attached directly to said glazed element.

Preferably, said base is fastened or attached indirectly to said glazed element by a connecting element, said orientation support preferably being made of plastic and said connecting element preferably being made of metal or metal alloy.

Preferably, said connecting element is fastened to a profiled seal which is fastened to said glazed element, or said connecting element is glued to said glazed element.

The invention also relates to a lighting system for a glazing according to the invention comprising said at least two longitudinal light modules, each supporting several point light sources, each having at least one longitudinal end, and preferably two longitudinal ends, each comprising means for attaching said two longitudinal ends to said orientation support and for spatially orienting said two longitudinal ends of the two light modules with respect to said orientation support.

Preferably, in a lighting system according to the invention, all the light modules are identical; all the light modules have the same length, the same width, the same number of point light sources and the same means of attachment to the connecting element. Thus, when manufacturing the glazing, there is no need to pay special attention to selecting a particular light module based on its future positioning in the glazing; all light modules are identical and interchangeable.

The invention further relates to a method for manufacturing a glazing according to the invention, comprising a curved glazed element providing a separation between an exterior space and an interior space and having an external face, an internal face and an edge face situated between these two faces, said glazing comprising a lighting system comprising several point light sources, of the LED type, and extending along at least one edge of said glazed element, and preferably along two opposite edges of said glazed element, situated further to the inside than said internal face of the glazed element.

Said method is characterized in that:

a base of at least one orientation support is fastened or attached to said glazed element, then at least two longitudinal light modules, each supporting several point light sources, each oriented along their length in a longitudinal direction, are positioned adjacent to one another along their length and each with one longitudinal end facing a longitudinal end of the other, being located less centrifugally than said base, then said two longitudinal ends are attached and spatially oriented along an axis (about an axis) of rotation substantially parallel to said glazed element and perpendicular to said longitudinal direction.

In a preferred embodiment, prior to fastening or attaching said base to said glazed element, a connecting element is fastened to a profiled gasket which is fastened to said glazed element, preferably by encapsulation; said base is then fastened or attached to said glazed element by said connecting element.

Advantageously, the invention enables the light modules to be more easily oriented and more reliably attached to the glazed element. This orientation is both in relation to the curvature of the glazed element (distance from the internal face of the glazed element) and in the centrifugal-centripetal direction in the plane of curvature (distance from the edge face of the glazed element). This orientation of the modules allows the point light sources to be oriented so that the lighting is preferably in the direction of the glazed element.

Advantageously, this attachment is particularly compact both in the inside-outside direction, so as not to take up too much interior space, and in the centrifugal-centripetal direction, so as not to restrict the view.

Advantageously additionally, in the event of failure of a light module, it can be changed without changing the other light modules in the lighting system, and without having to change the glazing.

The method according to the invention has the advantage of being easier to implement than prior art methods for manufacturing glazings with lighting system(s) of the prior art.

Described below, by way of non-limiting examples, will be several embodiments of the present invention referring to the appended figures in which:

FIG. 1 shows a perspective view of the interior space of a glazing according to the invention;

FIG. 2 shows a partial view, in central longitudinal cross section, of the glazing shown in FIG. 1;

FIG. 3 shows a schematic cross section of an edge of a glazing, and shows a glazed element illuminated from within;

FIG. 4 shows a schematic cross sectional view of an edge of a glazing according to a first embodiment of the invention; and FIG. 5 shows a schematic cross sectional view of an edge of a glazing according to a second embodiment of the invention.

FIG. 6 shows a partial perspective view of an edge of a glazing according to a third embodiment of the invention;

FIG. 7 shows an exploded partial perspective view of FIG. 6;

FIG. 8 shows another partial exploded perspective view of FIG. 6; and

FIG. 9 shows a schematic cross sectional view of an edge of a glazing according to the third embodiment of the invention.

The present invention is described by way of example in the context of an application as glazed unit 1, fixed, for a vehicle. This glazed unit closes an opening by providing the separation between an exterior space E which is outside the vehicle, and an interior space I which is inside the vehicle. The ideas of "exterior" and "interior" are therefore considered relative respectively to the exterior space and the interior space.

The present invention is described, by way of non-limiting example, by being applied to a roof glazing of a vehicle. With reference to FIG. 1, the glazing is viewed from the inside, oriented horizontally, that is, turned inside out with respect to its position as a vehicle roof glazing. In the figures in this document, the glazing is not yet installed in a body opening (so it is not visible).

The glazing unit 1 comprises a glazed assembly 2. This glazed element may be monolithic, that is, made up of a single sheet of material, or may be composite, that is, made up of several sheets of material between which at least one interlayer of adhesive material is inserted in the case of laminated glazing units. The sheet(s) of material may be made of mineral material, in particular glass, having for example undergone annealing or tempering, or of organic material, particularly of plastic material such as polyvinyl butyral. The interlayer preferably contains at least one thermoplastic plastic material, preferably polyvinyl butyral (PVB), ethylene-vinyl acetate (EVA), and/or polyethylene terephthalate (PET). However, the thermoplastic interlayer may also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylene, polyvinyl fluoride and/or ethylene-tetrafluoroethylene, or copolymers or mixtures thereof. The thermoplastic interlayer may be formed from one or more superimposed thermoplastic films, the thickness of a thermoplastic film not exceeding, preferably, 1.0 mm, in particular 0.25 mm or 0.5 mm to 1.0 mm or 0.9 mm, typically around 0.4 mm or 0.7 mm.

The glazing can form a vehicle side window. The vehicle can be a road vehicle, such as a car, truck, bus, streetcar or rail vehicle. The glazing may be fixed (non-movable in the vehicle's frame of reference).

The glazing is preferably positioned horizontally or essentially horizontally in the vehicle frame of reference.

In the context of the present document, the idea of "centripetal" and that of "centrifugal" is to be considered with respect to the central longitudinal axis of forward travel of the vehicle equipped with the glazing according to the invention used as an elongated roof glazing, that is, with the length of the glazing oriented along the axis of forward travel, generally referred to as the "X-X' axis" of the vehicle; the centripetal direction is in the direction of this axis, while the centrifugal direction is opposite this axis.

In the exemplary embodiment shown, the glazing 1 includes a glazed element 2 that is curved (that is, not flat) and laminated. However, the glazed element 2 could be monolithic.

The glazed element 2 has an outer face 20 oriented toward the exterior space E, an internal face 22 oriented toward the interior space I, and an edge face 21 situated between these two faces.

The glazed element 2 has a left longitudinal edge 23, a rear lateral edge 24, a right longitudinal edge 25 and a front lateral edge 26.

The glazed element 2 has four corners with positioning and attachment systems 29, for positioning and attaching the glazing to the vehicle opening.

The glazing 1 can comprise a profiled seal 6, which in this case is peripheral and extends along all four edges of the glazed element.

The glazed element 2 is a laminated glazed element which comprises, as can be seen in the vertical cross-section of FIG. 2, an exterior glass sheet 3, an interior glass sheet 5 and a plastic interlayer sheet 4 located between said two glass sheets.

However, it is possible for at least one other sheet to be interposed between the exterior glass sheet 3 and the plastic interlayer sheet 4 or between the plastic interlayer sheet 4 and the interior glass sheet 5.

In addition to the glazed element 2, the glazing 1 comprises at least one lighting system 27, 27', and here preferably two lighting systems 27, 27', each comprising several LED-type point light sources. The lighting system 27 extends along the left longitudinal edge 23 of the glazed element 2, and the lighting system 27' extends along the right longitudinal edge 25 of the glazed element 2.

Each lighting system 27, 27' is located further inwards than the internal face 22 of the glazed element 2 and thus constitutes an interior lighting system by being oriented toward the internal face 22 of the glazed element 2. The power supply for these modules is not detailed here.

An example of a prismatic system 100 is shown in FIG. 3. It can be inserted between the point light sources 110 and the external face 20 of the glazed element 2; it can comprise a lens and have a part (prismatic film 130) that fits into a recess in the glazed element, in particular a recess in the interior glass sheet 5, or even a recess in the plastic interlayer sheet 4. In this FIG. 3, the direction of the light emitted by the point light source 110 is depicted by the double arrow; it is inclined along a direction B because the point light source 110 is itself arranged on a support of the light module which is inclined along this direction B.

In addition, the light module is attached to the headliner 140, which is a trim element.

According to the invention, for at least one lighting system, and preferably for each lighting system 27, 27', at least two light modules 7, 7', and here four light modules 7, 7', 7'', 7''', all longitudinal, are arranged adjacent, each oriented along its length in a longitudinal direction. Each light module 7, 7' comprises several point light sources 110. For example, there could be ten LEDs per light module.

Each light module is straight and upright, in the shape of a right-angled block elongated along its length; all the light modules in a lighting system are identical here, so as not to complicate installation (and so as not to have to reference the modules in relation to their respective positions). All the point light sources are preferably rectilinear within a rectilinear light module.

As shown in more detail in FIG. 2, two light modules 7, 7', are arranged adjacent to one another and are each oriented along their length in a longitudinal direction 70, 70' one after the other and each have a longitudinal end 71 facing a longitudinal end 71' of the other. Although the longitudinal directions of the other light modules are not shown in this figure, these other light modules are also oriented along their length in a longitudinal direction one after the other, and each has one longitudinal end facing one longitudinal end of the other. Thus, all the light modules of a lighting system, and preferably of each lighting system, are arranged one after the other along their length to form a modular sequence; only the two modules each located at one end of this modular sequence have a free end that does not face a longitudinal end of another module.

According to the invention, the glazing 1 comprises at least one orientation support 8 at the connection between two adjacent light modules (here the light modules 7, 7', for simplicity). This orientation support 8 comprises a base 80 which is located next to the two longitudinal ends 71, 71' and more centrifugally than the two longitudinal ends 71, 71', that is, closer to the edge 23 than the longitudinal ends 71, 71'; this base 80 here is indirectly fastened to the glazed element 2 by a connecting element 9, but could be fastened directly to the glazed element 2 (the orientation support 8 could be glued directly to the glazed element 2).

FIG. 2 shows that adjacent light modules are not located at the same distance from the glazed element 2 at all points: some parts of each light module are closer to the glazed element 2 and other parts of these light modules are further away from the glazed element 2 (from the internal face 22 of the glazed element 2). Thus, the point light sources inside the light modules are not all located at exactly the same distance from the glazed element (using a tolerance of a tenth of a millimeter, for example). However, the point light sources are all located at an acceptable distance from the glazed element, that is, from the internal face 22 of the glazed element 2 (applying a tolerance of plus or minus 2.0 mm, for example).

The orientation support 8 attaches and spatially orients the two longitudinal ends 71, 71' so that the longitudinal directions 70, 70' of these two adjacent light modules 7, 7' are not parallel.

In the glazing 1 of FIG. 6 there are, for each of the edges 23, 25:

- n, integer=4, light modules 7, 7', 7'', 7'': four light modules located along the edge 23 and four light modules located along the edge 25; and
- n+1=5 orientation supports 8 for attaching and orienting these light modules: five orientation supports 8 for the light modules 7 located along the edge 23 and five orientation supports 8 for the light modules 7' located along the edge 25. All the orientation supports 8 are preferably identical so as to facilitate glazing manufacture (in order not to have to reference the orientation supports 8 with respect to their respective positions).

Each light module 7, 7' is thus attached and oriented at its two longitudinal ends by an orientation support 8.

In a first variant, shown in FIG. 2 to FIG. 5, the orientation support 8 spatially orients the two longitudinal ends 71, 71' about a single axis A of rotation extending transversely to the length of the glazed element 2.

In another variant detailed later in reference to FIG. 6 to FIG. 9, the orientation support 8 spatially orients the two longitudinal ends 71, 71' each about an axis A, A' of rotation extending transversely to the length of the glazed element 2.

It is this rotation or these rotations that enable the longitudinal ends 71, 71' to be oriented so that the longitudinal directions 70, 70' of the two adjacent light modules are not parallel, and thus to compensate for the curvature of the glazed element where necessary.

Whatever the variants, the orientation support 8 preferably comprises a flange 81 which extends from the base 80 in a centripetal direction and is located beneath the two longitudinal ends 71, 71', further inwards; said longitudinal ends 71, 71' are thus attached to the flange 81.

Viewed from the front, the orientation support 8 is thus T-shaped, with the trunk of the T forming the base 80 and the remainder of the T forming the flange 81, which extends toward a central longitudinal axis of the glazed element. The base 80 extends toward the interior space substantially from the internal face 22, being more centripetal than the edge face 21. The flange 81 extends longitudinally below the internal face 22, along the edge 23 and more centripetal than the edge face 21.

The base 80 is narrow and has a length of between 10.0 and 50.0 mm, in this case 21.0 mm. This width is sufficient to hold the flange 81 securely.

Here, the flange 81 further has a longitudinal groove 84, located even further inwards, for clipping the trim 15 of the headliner.

The flange 8 has a length L 81 of between 30.0 and 80.0 mm, in this case 45.0 mm.

To attach and orient the longitudinal ends 71, 71' to the orientation support 8, the latter has one or two male element(s) 82, 82' or one or two hollow female element(s). The longitudinal ends 71, 71' then each have a complementary shape, respectively a hollow female element 72, 72' located around a male element of the orientation support 8 or a male element surrounded by a female element of the orientation support 8.

To offer an additional degree of freedom and allow not only rotation but also translation of a longitudinal end relative to the orientation support, it is possible for a hollow female element to have an oblong internal cross-section and for the male element engaging with this hollow female element to have a circular external cross-section.

To lock the attachment of one longitudinal end to the orientation support 8, the male element may have a cavity 83 to accommodate a screw 10 or clip 10'.

In a first embodiment of the invention, shown in cross-section in FIG. 4, the orientation support 8 has a single male element 82 and the adjacent longitudinal ends 71, 71' each comprise a hollow cylinder 73, 73', or rather each a half-cylinder, these two half-cylinders complementing one another along their length to correspond substantially to the length of the male element 82. These two hollow cylinders 73, 73' each have an axis A, and the two axes are parallel, one after the other. This axis A is also the axis of the male element 82. A screw 10, screwed into the core of the male element 82, locks the attachment of the adjacent longitudinal ends 71, 71' with respect to the orientation support 8.

In a second embodiment of the invention, shown in cross-section in FIG. 5, the engagement enabling the adjacent longitudinal ends 71, 71' to be oriented with respect to the orientation support 8 is identical; the only difference is that the locking of the attachment of the adjacent longitudinal ends 71, 71' with respect to the orientation support 8 is done by a clip 10', located at the heart of the male element 82.

In a third embodiment of the invention, shown in FIG. 6 to FIG. 9, the orientation support 8 has two male elements 82 which are not parallel here but could be, and the two adjacent longitudinal ends 71, 71' each comprise a hollow cylinder 73, 73', each hollow cylinder being slid over a male element for the attachment of each longitudinal end. The two hollow cylinders 73, 73' thus each have an axis A, A' and the two axes are not parallel, but could be.

In particular, FIG. 6 shows a non-zero angle $\alpha$ between the two adjacent faces of the two longitudinal ends 71, 71'; without the rotation about the axes A, A', the two adjacent faces of the two longitudinal ends 71, 71' would be parallel (angle between them infinite or zero).

The cross-sectional views of FIG. 4, FIG. 5 and FIG. 9 also show that the glazing 1 includes a profiled seal 6 that is fastened to the edge of the internal face 22 and to the edge face 21, without being in contact with the external face 20; this is a "flush" profiled seal 6, that is, flush with the external face 20.

The connecting element 9 has a part which is incorporated in the profiled seal 6 and a part which projects outside the profiled seal 6. This projecting part is used here to attach, and more precisely to clip, the base 80, owing to the hole 90. The connecting element 9 is thus fastened indirectly to the glazed element 2, via the profiled seal 6, which is fastened directly to the glazed element 2.

However, the connecting element 9 could be glued directly to the glazed element 2.

The constituent material of the profiled seal 6 may be a polymer material such as a thermoplastic (PVC, TPE, etc.), a polyurethane or even a synthetic rubber such as EPDM or any other suitable flexible plastic material.

The attachment of the base 80 to the connecting element 9 is practical: it enables the connection of the connecting element 9 to the glazed element 2 and then the connection of the orientation support 8 to the connecting element 9 to be managed in two separate and independent steps.

To facilitate these two integrations, the connecting element 9 is made of metal or a metal alloy. The orientation support 8 here is made of plastic in order to be as light as possible.

A prefabricated profiled seal can be used to fasten the profiled seal 6 to the glazed element 2, and this profiled seal can be adhered to the glazed element; this adhesion can be achieved using an adhesive strip formed by a layer of glue or an adhesive tape, in particular a double-sided adhesive tape.

However, it is preferable to use an encapsulation method: it comprises a step of molding the profiled seal 6 in a molding device, between two molding elements, one molding element accommodating the internal face 22 and one molding element accommodating the external face 20, these two molding elements being closed on one another during the molding step while at the same time producing therebetween a molding cavity which is filled with the material of which the profiled seal 6 is made during the step of molding of this seal.

The profiled seal 6 is preferably arranged around the entire periphery of the glazed element 2, although this profiled seal 6 could very well be positioned on only one or more part(s) of the glazed element 2.

The glazed element 2 is manufactured before the profiled seal 6 is fastened to the glazed element 2 and before the orientation support 8 is attached to the connecting element 9.

In this way, the lighting system 27, 27' can be attached (indirectly, via the orientation support(s) 8) to the glazing 1 independently of the manufacture of the glazed element 2, which may be provided with a profiled seal 6: it is therefore possible to provide, for the same series of glazings, glazings comprising one or more lighting system(s) and glazings without any lighting system; this is important to allow the presence of at least one lighting system to be optional for the vehicle.

A lighting system 27, 27' according to the invention comprises at least two longitudinal light modules 7, 7', and preferably the number of light modules required for a complete edge of the glazing (here four light modules), and each light module has at least one longitudinal end 71, 71', and preferably two longitudinal ends, each comprising means for attaching the two longitudinal ends 71, 71' to the orientation support 8 and for spatially orienting the two longitudinal ends 71, 71' of two adjacent longitudinal ends 71, 71' with respect to the orientation support 8.

In the method for manufacturing the glazing 1 according to the invention:

- step 1—the base 80 of at least one orientation support 8 is first fastened or attached to the glazed element 2 (preferably here by the connecting element 9), and preferably all the bases 80 of all the orientation supports 8 are first fastened or attached to the glazed element 2, then
- step 2—for each orientation support 8: two longitudinal light modules 7, 7' are each oriented along their length in a longitudinal direction 70, 70' and are positioned adjacent to one another along their length, each with a longitudinal end 71 facing a longitudinal end 71' of the other, while being less centrifugal than the base 80 of the orientation support 8, then
- step 3—for each orientation support 8: these two longitudinal ends 71, 71', are attached and spatially oriented, oriented along an axis A, A' of rotation substantially parallel to the glazed element 2 and perpendicular to said longitudinal direction 70, 70'.

For positioning step 2, the two longitudinal ends 71, 71' are preferably positioned above the flange 81.

For step 3 of attachment and orientation of the longitudinal ends 71, 71', the attachment can take place before, at the same time as or after spatial orientation, depending on the chosen engagement between the longitudinal ends 71, 71' and the orientation support.

For each lighting system 27, 27', it is possible to perform all steps 2 for all the orientation supports 8, then all steps 3, or to mix one or more steps 2, then one or more steps 3.

Preferably, before step 1, the connecting element 9 is fastened to the profiled seal 6, which is previously fastened to the glazed element (2), then the base 80 is attached or fastened to the connecting element 9; alternatively, the connecting element 9 is glued to the glazed element 2, then the base 80 is attached or fastened to the connecting element 9.

Although not shown, the light modules are arranged under a black layer, such as an enamel layer, which is arranged on or in the glazed element, so as not to be visible from the outside.

The invention claimed is:

1. A vehicle glazing comprising:

a curved glazed element providing a separation between an exterior space and an interior space and having an external face, an internal face and an edge face situated between the external and internal faces, a lighting system comprising several point light sources, and extending along at least one edge of said curved glazed element, situated further to the inside than said internal face of the curved glazed element, wherein the lighting system comprises:

at least two adjacent longitudinal light modules, each supporting several point light sources, each oriented along its length in a longitudinal direction one after the other and each having a longitudinal end facing a longitudinal end of the other, and at least one orientation support having a base located more centrifugally than the two longitudinal ends and being fastened or attached to said curved glazed element, said orientation support configured to attach and spatially orient said two longitudinal ends about an axis of rotation substantially parallel to said curved glazed element and perpendicular to said longitudinal direction.

2. The vehicle glazing according to claim 1, wherein said orientation support comprises a flange which extends from said base in a centripetal direction and is located beneath the two longitudinal ends, further inwards than the longitudinal ends, said longitudinal ends thus being attached to said flange.

3. The vehicle glazing according to claim 2, wherein said flange has a longitudinal groove located further inwards than said flange.

4. The vehicle glazing according to claim 1, wherein said orientation support has one, or two, male element(s) or one, or two, hollow female element(s) and said longitudinal ends each respectively have a hollow female element located around a male element of said orientation support or a male element surrounded by a female element of said orientation support, for attachment and orientation of said light modules to said orientation support.

5. The vehicle glazing according to claim 4, wherein said hollow female element has a circular or oblong internal cross-section and said male element has a circular external cross-section.

6. The vehicle glazing according to claim 4, wherein said male element has a receiving cavity for locking the attachment.

7. The vehicle glazing according to claim 1, wherein two adjacent light modules each comprise a hollow cylinder, the two hollow cylinders each having an axis and the two axes being parallel.

8. The vehicle glazing according to claim 1, wherein two adjacent light modules each comprise a hollow cylinder, the two hollow cylinders each having an axis and the two axes not being parallel.

9. The vehicle glazing according to claim 1, wherein n, integer, light modules are located along an edge of said curved glazed element and n+1 orientation supports enable the light modules to be attached and oriented along said edge.

10. The vehicle glazing according to claim 1, wherein said base is fastened or attached to said curved glazed element by a connecting element.

11. The vehicle glazing according to claim 10, wherein said connecting element is fastened to a profiled seal which is fastened to said curved glazed element.

12. A lighting system for a glazing according to claim 1, comprising at least two longitudinal light modules, each supporting several point light sources, each having at least one longitudinal end, each comprising means for attaching said two longitudinal ends to said orientation support and for spatially orienting said two longitudinal ends of the two light modules with respect to said orientation support.

13. A method of manufacturing a vehicle glazing according to claim 1, comprising a curved glazed element providing a separation between an exterior space and an interior space and having an external face, an internal face and an edge face situated between the external and internal faces, said glazing comprising a lighting system comprising several point light sources, and extending along at least one edge of said curved glazed element, situated further to the inside than said internal face of the curved glazed element, the method comprising:

fastening or attaching a base of at least one orientation support to said curved glazed element, then positioning at least two longitudinal light modules, each supporting several point light sources, each oriented along their length in a longitudinal direction adjacent to one another along their length and each with one longitudinal end facing a longitudinal end of the other, being located less centrifugally than said base, then attaching said two longitudinal ends spatially oriented along an axis of rotation substantially parallel to said curved glazed element and perpendicular to said longitudinal direction.

14. The method according to claim 13, wherein, prior to fastening or attaching said base to said curved glazed element, a connecting element is fastened to a profiled seal which is fastened to said curved glazed element.

15. The vehicle glazing according to claim 1, wherein the point light sources are LED light sources.

16. The vehicle glazing according to claim 1, wherein the several point light sources extend along two opposite edges of said curved glazed element.

17. The vehicle glazing according to claim 10, wherein said orientation support is made of plastic and said connecting element is made of metal or metal alloy.

18. The lightning system according to claim 12, wherein each of the at least two longitudinal light modules has two longitudinal ends.

19. The method according to claim 13, wherein the point light sources are LED light sources.

20. The method according to claim 13, wherein the several point light sources extend along two opposite edges of said curved glazed element.

* * * * *